United States Patent
Smailus

(10) Patent No.: US 9,214,136 B1
(45) Date of Patent: Dec. 15, 2015

(54) HIGHLIGHTING AN OBJECT IN A DISPLAY USING A DYNAMICALLY GENERATED HIGHLIGHT OBJECT

(75) Inventor: Thomas O. Smailus, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 142 days.

(21) Appl. No.: 13/456,478

(22) Filed: Apr. 26, 2012

(51) Int. Cl.
G09G 5/10 (2006.01)
G09G 5/14 (2006.01)
H04N 21/431 (2011.01)

(52) U.S. Cl.
CPC ............. G09G 5/14 (2013.01); H04N 21/4312 (2013.01); *H04N 2201/3245* (2013.01)

(58) Field of Classification Search
CPC ............ G09G 5/14; G09G 5/00; G06T 11/00; G06T 11/60; G06T 15/503
USPC .......................................................... 345/629
See application file for complete search history.

(56) References Cited

U.S. PATENT DOCUMENTS

| | | | |
|---|---|---|---|
| 6,606,731 B1 | 8/2003 | Baum et al. | |
| 6,802,055 B2* | 10/2004 | Jade et al. | 717/130 |
| 7,787,708 B2* | 8/2010 | Scheidhauer et al. | 382/284 |
| 7,876,335 B1* | 1/2011 | Pittenger et al. | 345/629 |
| 7,962,862 B2* | 6/2011 | Kulp et al. | 715/856 |
| 7,971,194 B1 | 6/2011 | Gilboa | |
| 2005/0134606 A1* | 6/2005 | Hong et al. | 345/619 |
| 2007/0176944 A1* | 8/2007 | Brown et al. | 345/592 |
| 2007/0192739 A1 | 8/2007 | Hunleth et al. | |
| 2008/0046845 A1* | 2/2008 | Chandra | 715/856 |
| 2008/0163283 A1* | 7/2008 | Tan et al. | 725/20 |
| 2009/0102837 A1* | 4/2009 | Kang et al. | 345/419 |
| 2009/0183202 A1 | 7/2009 | Yoon et al. | |
| 2009/0233705 A1 | 9/2009 | LeMay et al. | |
| 2010/0085303 A1* | 4/2010 | Kwok et al. | 345/157 |
| 2011/0096174 A1* | 4/2011 | King et al. | 348/207.1 |
| 2011/0252315 A1 | 10/2011 | Misawa et al. | |
| 2012/0008864 A1 | 1/2012 | Kanatsu et al. | |
| 2012/0013621 A1* | 1/2012 | Ospina Gonzalez | 345/473 |

OTHER PUBLICATIONS

"CyberText Newsletter", CyberText Consulting, May 2009, [retrieved on Jun. 17, 2015], Retrieved from the Internet <URL:https://cybertext.wordpress.com/2009/02/23/word-addremove-highlighting-with-the-keyboard/>.*
Scalable Vector Graphics (SVG) 1.1 (Second Edition), W3C Recommendation, Aug. 16, 2011, retrieved from the Internet at http://www.w3.org/TR/2011/REC-SVG11-20110816.

(Continued)

*Primary Examiner* — Stephen R Koziol
*Assistant Examiner* — Terrell Robinson
(74) *Attorney, Agent, or Firm* — Toler Law Group, PC

(57) ABSTRACT

A particular method includes detecting an interaction event using an event capture object of a rendered display of a graphics file. The graphics file is rendered to generate the rendered display by layering one or more foreground objects over one or more background objects. The method also includes executing code associated with the graphics file in response to detecting the interaction event. The code is executed to determine information descriptive of the event capture object, to generate a highlight object corresponding to the event capture object, and to modify the rendered display to display the highlight object.

20 Claims, 3 Drawing Sheets

(56) References Cited

OTHER PUBLICATIONS

"Snagit Help Document," Release 10.0, May 2010, TechSmith Corporation, Okemos, Michigan, 194 pages.

Martin, D.W., "Snagit for Mac 20 years Late, but Worth the Wait [Review]," Retrieved from <<http://www.cultofmac.com/69091/snagit-for-mac-20-years-late-but-worth-the-wait-review/>>, Dec. 10, 2010, 7 pages.

* cited by examiner

HIGHLIGHTING AN OBJECT IN A DISPLAY USING A DYNAMICALLY GENERATED HIGHLIGHT OBJECT

FIELD OF THE DISCLOSURE

The present disclosure is generally related to highlighting an object in a display.

BACKGROUND

Some vector graphics techniques use a "painter rendering model" for rendering. When using a painter rendering model, objects are rendered one over another (in a manner that may be thought of as layering). For example, a first object is rendered, and then a subsequent object is rendered, possibly partially overlaying or obscuring the first object. Objects may be defined in a graphics file in a manner that specifies the arrangement or order of the objects in a rendered display. For example, objects defined at the beginning of the graphics file may be rendered first (and are therefore at the back or lower layers of the rendered display) and objects at the end of the graphics file may be rendered last (and therefore at the front or upper layers of the rendered display).

In order to detect user events, a graphics file may include an event capture object. The event capture object may detect user interaction events, such as mouse over events. The event capture object may be used to highlight regions of a rendered display by triggering execution of code that causes the event capture object or another object to be modified in the rendered display. Methods of highlighting objects in a painter rendering model rendered display can be less than satisfactory because the order in which the objects are layered in the rendered display can lead to highlighting that does not behave as users expect. Further, a graphics file that includes data to enable highlighting of objects in a rendered display can be very large as a result of the amount of data used to define multiple objects, to link the objects to enable highlighting, and to provide executable code to implement highlighting based on user events.

SUMMARY

A particular embodiment enables highlighting of graphical elements in a painter model rendered display by dynamically generating a highlight object in response to a user interaction event associated with a "hotspot". A hotspot refers to a portion of the rendered display that includes an event capture object that is capable of detecting the user interaction event. The event capture object may overlay one or more display object (i.e., graphic elements, such as text, that are to be highlightable). To avoid being obscured, the event capture object may be at an upper most layer of the rendered display. When the event capture object detects a first interaction event (e.g., a "mouse-in" event indicating that a user has moved a pointer into an area associated with the event capture object), the event capture object may cause software code to be executed that dynamically generates (i.e., at run time) the highlight object and inserts it into the graphic. The highlight object may have identical size, shape and coordinate position as the event capture object. The software code may cause the dynamically generated highlight object to be displayed in the rendered display. The highlight object may be displayed in a manner that visually distinguishes it from a background of the rendered display. In response to detecting a second interaction event (e.g., a "mouse-out" event indicating that a user has moved the pointer out of the area associated with the event capture object), the event capture object may cause software code to be executed that dynamically removes the highlight object from the graphic and thus the display.

In a particular embodiment, a method includes detecting an interaction event using an event capture object of a rendered display of a graphics file. The graphics file is rendered to generate the rendered display by layering one or more foreground objects over one or more background objects. The method also includes executing code associated with the graphics file in response to detecting the interaction event. The code is executed to determine information descriptive of the event capture object, to generate a highlight object corresponding to the event capture object, and to modify the graphic by inserting the highlight object and modify the rendered display to display the highlight object.

In another particular embodiment, an apparatus includes a memory storing code associated with a graphics file. The graphics file includes multiple event capture objects. The apparatus also includes a processor coupled to the memory. The processor is configured to detect an interaction event associated with a particular event capture object at a rendered display of the graphics file, where the graphics file is rendered to generate the rendered display by layering one or more foreground objects over one or more background objects. The processor is also configured to execute the code associated with the graphics file in response to detecting the interaction event. The code is executed to determine information descriptive of the particular event capture object, to generate a highlight object corresponding to the particular event capture object, and to modify the rendered display to display the highlight object.

In another embodiment, a tangible computer-readable storage medium includes processor-executable code that, when executed by a processor, causes the processor to perform a method. The method including detecting an interaction event associated with an event capture object at a rendered display of a graphics file, where the graphics file is rendered to generate the rendered display by layering one or more foreground objects over one or more background objects. The method also includes determining information descriptive of the event capture object, generating a highlight object corresponding to the event capture object, and modifying the rendered display to display the highlight object.

Thus, particular embodiments use a generic portion of code to generate a highlight object corresponding to an event capture object at runtime. The generic portion of code may generate the highlight object using parameters that define the event capture object such that the highlight object has a size, shape and coordinate position identical to the size, shape and coordinate position of the event capture object. Accordingly, a graphics file that uses embodiments disclosed herein can be significantly smaller (i.e., use less memory) than a graphics file that includes data defining the highlight object, or explicitly defining code for each hotspot to highlight an individual object.

The features, functions, and advantages that have been described can be achieved independently in various embodiments or may be combined in yet other embodiments, further details of which are disclosed with reference to the following description and drawings.

DETAILED DESCRIPTION

Figure 1:
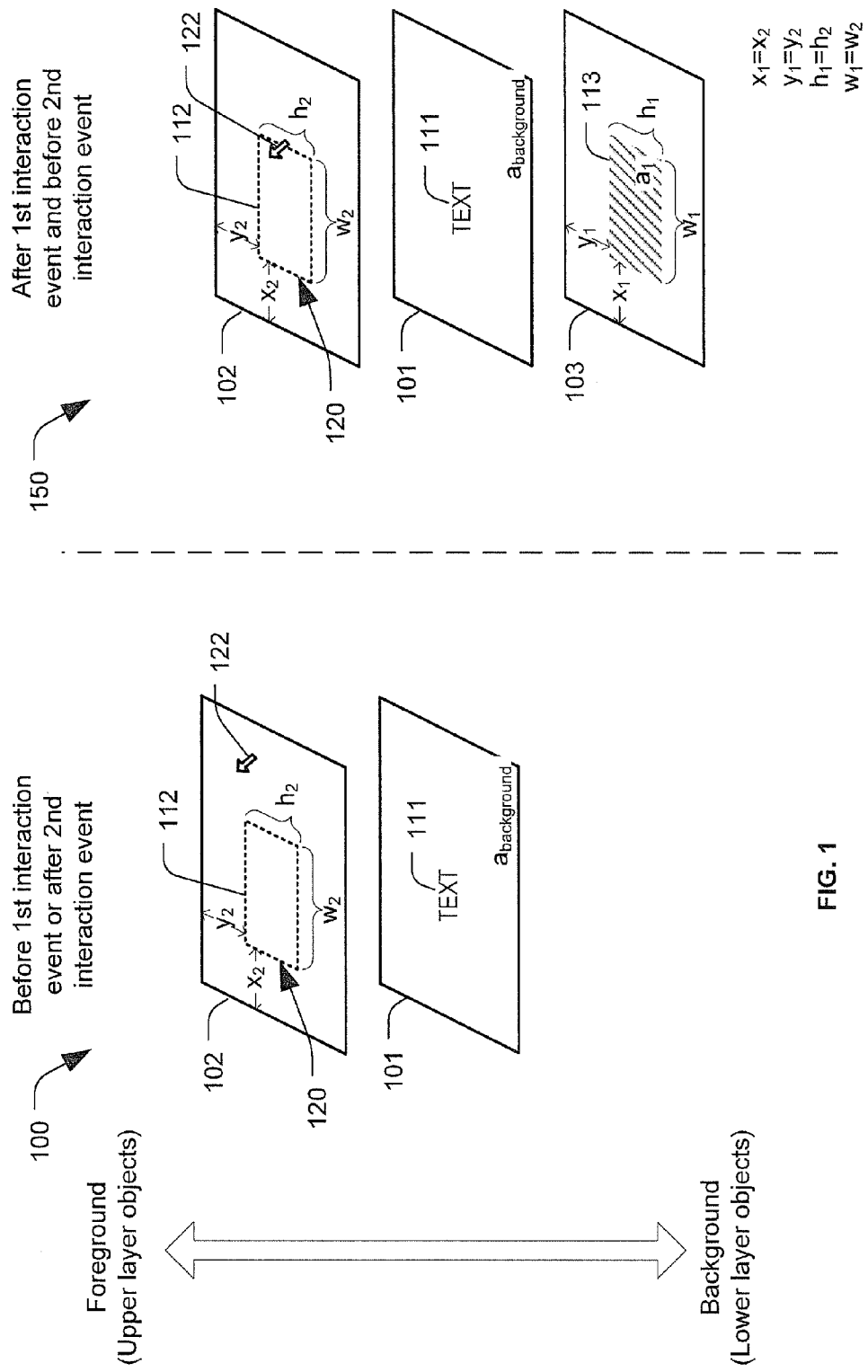
FIG. 1 shows a diagram illustrating layers of a rendered display with and without a highlight object according to a particular embodiment.

FIG. 1 shows a diagram illustrating layers of a rendered display with and without a highlight object according to a particular embodiment. In particular, FIG. 1 illustrates a first rendered display 100 of a graphics file and a second rendered display 150 of the graphics file. The first rendered display 100 corresponds to a time before a first interaction event is detected or after a second interaction event has been detected. The second rendered display 150 corresponds to a time after the first interaction event has been detected and before the second interaction event has been detected.

The first rendered display 100 includes objects specified or defined within the graphics file. For example, the first rendered display 100 includes a first layer 101 and a second layer 102. The second rendered display 150 includes the objects specified or defined within the graphics file and a dynamically generated highlight object 113 (described further below). For example, the second rendered display 100 includes the first layer 101, the second layer 102, and a third layer 103 that includes the dynamically generated highlight object 113. The layers 101-103 are shown merely to simplify the following description and are not intended to indicate that the methods of highlighting objects in a rendered display disclosed herein are limited to rendering models that use layers. Rather, the layers 101-103 are shown to illustrate a painter model of rendering, in which lower layer objects, such as objects associated with the first layer 101, are rendered before upper layer objects, such as objects associated with the second layer 102.

Scalable Vector Graphics (SVG) is an example of a graphics format that uses the painter model to render SVG compliant drawings, such as technical drawings. Other painter rendering model graphics files that support user embedded runtime code may be used as well or in the alternative. In a painter rendering model, objects may be rendered in the order that the objects are specified in a graphics file. Thus, a graphics file used to render the layers in the first rendered display 100 would include data defining an object of the first layer 101 before data defining an object of the second layer 102. Likewise, the graphics file may be modified at runtime (e.g., in working memory) in response to the first interaction event (described further below) to include data defining the dynamically generated highlight object 113 of the third layer 103 before data defining objects of the first layer 101 or the second layer 102. These modifications would result in an updated display rendering, reflecting the updated graphics data.

FIG. 1 also shows a "hotspot" 120. A hotspot refers to a region with which a user can interact with a rendered display via an interaction event. For example, the hotspot 120 may be associated with a portion of text, a graphical element (e.g., a drawing element), or another portion of a rendered display that is to be associated with interactive features, such as highlighting. The hotspot 120 includes an object to be highlighted (also referred to as a display object 111) and an event capture object 112. The event capture object 112 may overlay the display object 111; however, the event capture object 112 may not be visible in the rendered display so as not to obscure the display object 111. For example, the event capture object 112 may be rendered with an opacity value that causes the display object 111 to be visible through the event capture object 112. The event capture object 112 may include or be associated with code that enables the event capture object 112 to detect user interaction with the event capture object 112. For example, the event capture object 112 may include code that enables the event capture object 112 to detect when a pointer 122 controlled by the user has entered boundaries that specify the event capture object 112, referred to as a mouse-in event. In another example, the event capture object 112 may include code that enables the event capture object 112 to detect when a pointer 122 controlled by the user has exited boundaries that specify the event capture object 112, referred to as a mouse-out event. Examples of other interaction events that the event capture object 112 may be configured to detect include other events responsive to a pointing device (also referred to as a mouse event), such as mouseover events, hover events, mouse click events, and double click events, and events responsive to a keyboard or other input device, such as keydown events and keyup events.

The graphics file may include multiple hotspots of which the hotspot 120 is a representative example. The graphics file may also include code (e.g., processor executable instructions) that uses information provided by a particular event capture object to dynamically generate (at runtime) a corresponding highlight object. Thus, the graphics file may not include data defining the dynamically generated highlight object 113. Rather, the dynamically generated highlight object 113 may be generated and added to the rendered display at runtime only as needed. The graphics file may include software code or other processor-executable instructions that are executable to dynamically generated highlight objects, such as the dynamically generated highlight object 113, responsive to detected interaction events.

Using the embodiment depicted in FIG. 1 as a representative example, the first rendered display 100 may be generated using a graphics file that defines the display object 111 and the event capture object 112, as in the following illustrative pseudo code:

Graphics File Excerpt:
-------------------------------

```
<!-- Display Object (e.g., Text item to hotspot): (at line 832 of the graphics file)—diagram content to be highlighted and interacted with -->
<text id="T10" x="16479" y="15250" >
<tspan id="tr-EQUIP139CR">1234ABC</tspan>
</text>
<!-- Event Capture Object: (e.g., at line 2313 of the graphics file)—object that reacts to/captures the interaction events—drawn later than and thus above the display object -->
<g id="hs-tr-EQUIP139CR"
onmouseover="addDynHot(evt, highlightTextref, 'textref-bg')"
onmouseout="remDynHot(evt, unhighlightTextref)"
fill="none" class="textref" >
<rect x="16479" y="15250" width="675" height="119" />
</g>
```

In the above graphics file pseudo code example, user defined handlers (highlightTextref and unhighlightTextref) are graphics file application specific. The user defined handlers are passed to dynamic hotspot handlers, addDynHot and remDynHot, (described in pseudo code below) as parameters. The style/appearance information for the dynamically generated highlight object 113 (e.g., a CSS style to be applied) may also be passed as a parameter. Additionally, data defining location, size and shape of the event capture object 112 is provided to the dynamic hotspot handlers as parameters used to generate the dynamically generated highlight object 113.

The following pseudo code is an example of code that may implement an addDynHot dynamic hotspot handler.

```
// Function: addDynHot
// Purpose: dynamically add a highlight object in background based on event capture object definition and using the specified graphical style
// Parameters: evt, the event—a mouse pointer entry event
// handler, the application specific handler for the event
// style, the graphical style to apply to the hotspot art
function addDynHot(evt, handler, style) {
  // duplicate the event capture object in a background group and activate it with the specified graphical style
  var backgroundGroup=document.getElementById("background-hotspots");
  var thisNode=evt.target.parentNode;
  if (backgroundGroup==null) {
    // no background group (e.g., the third layer 103 of FIG. 1) found . . . so create it
    var SVGRoot=document.documentElement;
    var backgroundGroup=document.createElementNS(svgns,"g");
    backgroundGroup.setAttributeNS(null,"id","background-hotspots");
    var pg=thisNode.parentNode;
    SVGRoot.insertBefore(backgroundGroup, SVGRoot.firstChild);
  }
  var bgId=thisNode.getAttributeNS(null, "id");
  bgId=bgId+"-bg";
  var bgHotspot=document.createElementNS(svgns, "g");
  bgHotspot.setAttributeNS(null, "id", bgId);
  bgHotspot.setAttributeNS(null,"class", style);
  bgHotspot.setAttributeNS(null,"transform", thisNode.parentNode.getAttributeNS(null,"transform"));
  var thisChildren=thisNode.childNodes;
  for (var i=0; i<thisChildren.length; i++) {
    if (thisChildren[i].nodeType=1) {
      var newNode=thisChildren[i].cloneNode(true);
      bgHotspot.appendChild(newNode);
    }
  }
  backgroundGroup.appendChild(bgHotspot);
  // call the correct event processing handler
  handler(evt);}
```

When the event capture object 112 calls the addDynHot dynamic hotspot handler described in the above pseudo code, the addDynHot dynamic hotspot handler uses data defining the size, shape and coordinate position of the event capture object 112 to create the dynamically generated highlight object 113. The dynamically generated highlight object 113 is assigned a first display attribute, a1, based on a specified graphical style. The specified graphical style may be a default style for highlighting that is associated with a graphical application rendering the display or associated with the graphics file. The dynamically generated highlight object 113 may be rendered in a layer that is below the event capture object 112 and below an object to be highlighted, such as the display object 111. For example, the dynamically generated highlight object 113 may be generated at a background layer, such as the third layer 103. When the background layer has not been defined, the background layer may be dynamically generated.

To ensure that a name assigned to the dynamically generated highlight object 113 does not conflict with an object that has already been named in the graphics file, a naming convention may be used. For example, an identifier of the event capture object 112 may be provided to the addDynHot dynamic hotspot handler. The addDynHot dynamic hotspot handler may use the identifier of the event capture object 112 to compute, determine or derive an identifier for the dynamically generated highlight object 113. For example, the addDynHot dynamic hotspot handler may add or concatenate an affix "-bg" to the identifier of the event capture object 112 to generate the identifier assigned to the dynamically generated highlight object 113. Additionally or in the alternative, the naming convention may enable the identifier of the dynamically generated highlight object 113 to be computed, derived or determined in some other manner than adding an affix. For example, an affix may be removed from the identifier of the event capture object 112 to name the dynamically generated highlight object 113. In another example, a numerical value may be computed (e.g., incremented) to determine the identifier assigned to the dynamically generated highlight object 113 based on the identifier of the event capture object 112. Using the naming convention may enable automated processing of a file to add hotspots. For example, a file may be processed using the techniques described in U.S. Pat. No. 6,606,731, which is expressly incorporated herein by reference for all purposes, to automatically identify and name display objects, and an event capture object may be automatically generated for a display object and named using the naming convention.

In a particular embodiment, the graphical style used to dynamically generate the highlight object 113 is selected in order to visually distinguish an area around or corresponding to the display object 111 from a remaining area of the rendered display. For example, the remaining area of the rendered display may have an attribute, $a_{background}$. The attribute, $a_{background}$, may specify a color, a texture, an opacity, an intensity, a hue, a line type, a line width, a line color, fill pattern, a shading or another visual property that is used to render a portion of the rendered display. The dynamically generated highlight object 113 may be assigned an attribute, $a_1$. The attribute, $a_1$, may cause the dynamically generated highlight object 113 to be visually distinct from the remaining area of the rendered display. For example, a color, a texture, an opacity, an intensity, a hue, a line type, a line width, a line color, fill pattern, a shading or another visual property of the dynamically generated highlight object 113 may be visually distinct.

In a particular embodiment, the dynamically generated highlight object 113 is assigned dimensions, such as a width, $w_1$, and a height, $h_1$ that are equal to or visually equivalent to, a width, $w_2$, and a height, $h_2$, of the event capture object 112. Additionally, the dynamically generated highlight object 113 may be assigned a coordinate position in the rendered display, illustrated as $(x_1, y_1)$ in FIG. 1, which is equal, or visually equivalent, to a coordinate position in the rendered display of the event capture object 112, illustrated in FIG. 1 as $(x_2, y_2)$. Positioning the dynamically generated highlight object 113 under the event capture object 112, and under display object 111, avoids display hysteresis, where the area of the display modified in response to an event does not directly correspond to a location where the event was detected. Display hysteresis can be confusing to users. Additionally, positioning the highlight object 113 beneath the display object 111 enables the full coloration and display capabilities of the highlight object 113 to be utilized without obscuring, distorting or filtering the display object 111. Modifying the appearance of the display object 111 or objects on top of it, such as the event capture object 112, may result in graphical effects that are not desirable and that are confusing to users.

The following pseudo code is an example of code that may implement an remDynHot dynamic hotspot handler.

```
// Function: remDynHot
// Purpose: dynamically remove the highlight object 113
based on identifier of the event capture object 112 and call a
user supplied application-specific handler for the hotspot
entry.
// Parameters: evt, the event—a mouse pointer exit event
// handler, the application specific handler for the event
function remDynHot(evt, handler) {
    handler(evt);
    // remove the dynamically generated highlight object 113
    var    bgId=evt.target.parentNode.getAttributeNS(null,
"id");
    bgId=bgId+"-bg";
    var bgItem=document.getElementById(bgId);
    var parent=bgItem.parentNode;
    parent.removeChild(bgItem);
}
```

The example pseudo code of the remDynHot dynamic hotspot handler may be implemented responsive to detection of a second interaction event (e.g., a mouse-out event) to remove the dynamically generated highlight object 113 from the rendered display. Thus, when the dynamically generated highlight object 113 is removed, the second rendered display 150 may revert back to the first rendered display 100.

As explained above, a naming convention may be used to assign a name (or identifier) to the dynamically generated highlight object 113. When the naming convention is used to assign the name to the dynamically generated highlight object 113, the name of the dynamically generated highlight object 113 may be computed based on the name (or identifier) of the event capture object 112. An event that is generated in response to detecting the second interaction event may be passed to the remDynHot dynamic hotspot handler as a parameter to enable access to the name of the event capture object associated with the event. The remDynHot dynamic hotspot handler can use the name of the event capture object 112 to compute the name of the dynamically generated highlight object 113 in order to select the object to be removed from the second rendered display 150. In other embodiments, where the naming convention is not used, the dynamically generated highlight object 113 to be removed may be selected in another manner, such as by detecting an object that is in the background layer 103 that has a size, shape and coordinate position that corresponds to the event capture object's size, shape and coordinate position.

In a particular embodiment, the dynamically generated highlight object 113, the event capture object 112, or both, may be associated with code to perform other functions. To illustrate, when an interaction event is detected by the event capture object 112, instructions may be executed that cause additional information related to the display object 111 (e.g., detailed specifications, links to other graphics files that include the display object 111, etc.) to be rendered in the display.

Accordingly, particular embodiments use a generic portion of code (i.e., a portion of code that is not limited to a particular object of a graphics file, such as the remDynHot dynamic hotspot handler) to generate a highlight object corresponding to an event capture object at runtime. The generic portion of code may generate the highlight object using parameters that define the event capture object such that the highlight object has a size, shape and coordinate position identical to the size, shape and coordinate position of the event capture object. Accordingly, a graphics file that uses embodiments disclosed herein can be significantly smaller (i.e., use less memory) than a graphics file that includes data defining the highlight object.

Figure 2:
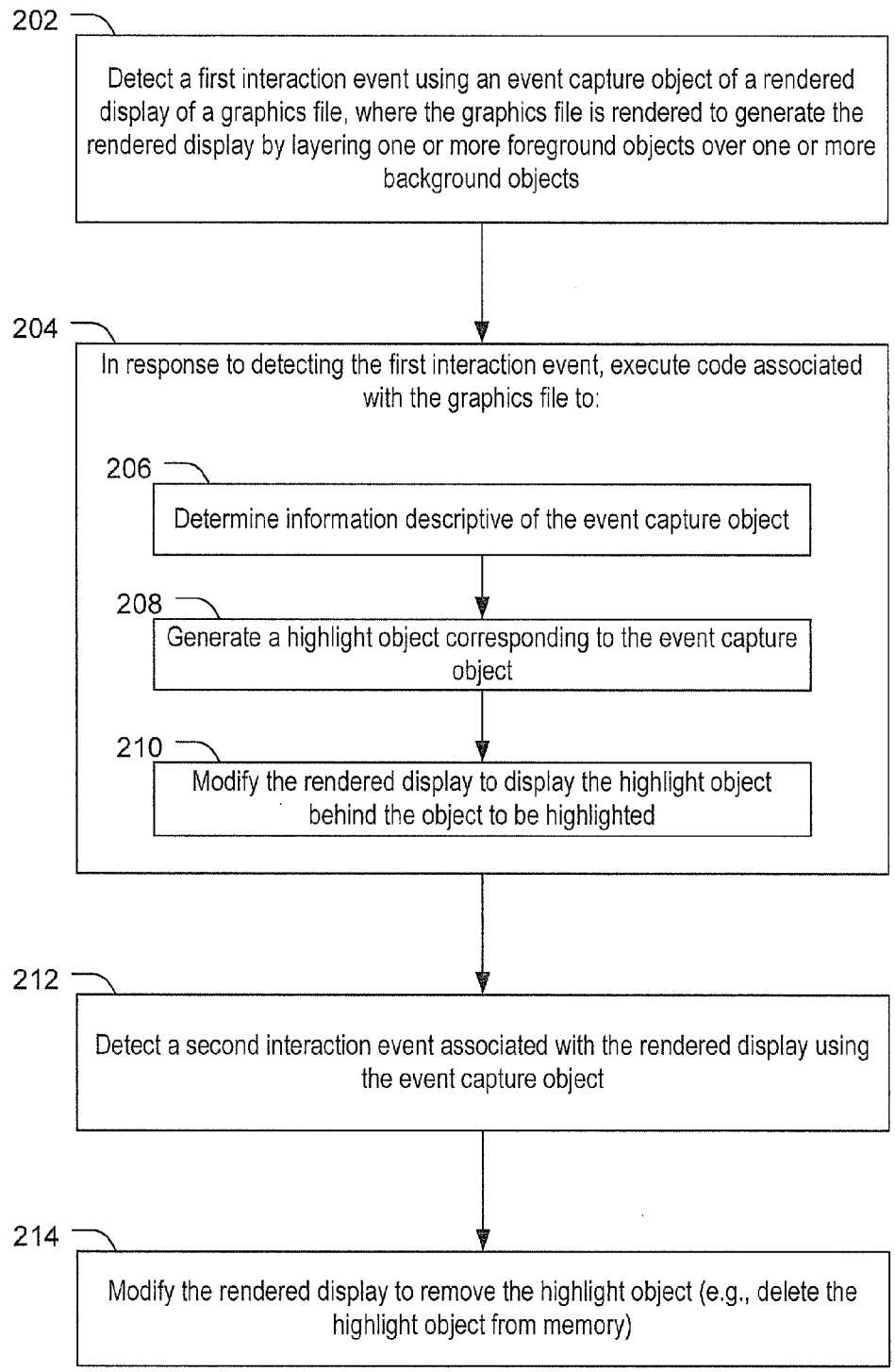
FIG. 2 shows a flow diagram illustrating a method for highlighting an object in a display according to a particular embodiment.

FIG. 2 shows a flow diagram illustrating a method of dynamically generating a highlight object in a rendered display according to a particular embodiment. The method of FIG. 2 may be executed by a computer system generating a rendered display of a graphics file, as described with reference to FIGS. 1 and 3.

The method includes, at 202, detecting a first interaction event using an event capture object of a rendered display of a graphics file. The graphics file may be rendered to generate the rendered display by layering one or more foreground objects over one or more background objects. For example, the graphics file may be rendered using a painter model, as described with reference to FIG. 1.

At 204, code associated with the graphics file (such as the addDynHot dynamic hotspot handler described above) may be executed in response to detecting the first interaction event. The code may determine information descriptive of the event capture object, at 206. For example, the information descriptive of the event capture object may include parameters defining a size of the event capture object in the rendered display, a shape of the event capture object in the rendered display, a coordinate position of the event capture object in the rendered display, other characteristics of the event capture object in the rendered display, or a combination thereof.

The code may also generate a highlight object corresponding to the event capture object, at 208. For example, the highlight object may be generated dynamically (e.g., at runtime) in a working memory of a computer device (as opposed to being stored in a graphics file). The highlight object may also be generated based on a predefined graphic style such that the highlight object is visually distinguishable from a background or other areas of the rendered display (e.g., using a different color than a background color). The code may also modify the rendered display to display the highlight object, at 210.

The method may include, at 212, detecting a second interaction event associated with the rendered display using the event capture object. For example, the first interaction event may be a mouse-in event indicating that a user has placed a pointer or cursor over an area of the rendered display corresponding to the event capture object, and the second interaction event may be a mouse-out event indicating that the user has moved the pointer or cursor away from the area corresponding to the event capture object. In response to detecting the second interaction event, second code associated with the graphics file (such as the remDynHot dynamic hotspot handler described above) may be executed to modify the rendered display to remove the highlight object. For example, the highlight object may be deleted from memory. Thus, after the highlight object is removed from the rendered display, the highlight object is not stored in memory of a computer system rendering the rendered display.

Thus, before the first interaction event, the graphics file does not include the highlight object, and after the second interaction event, the graphics file does not include the highlight object. Accordingly, the graphics file can be smaller than a file that contains the same graphical information and that also includes highlight objects.

Figure 3:
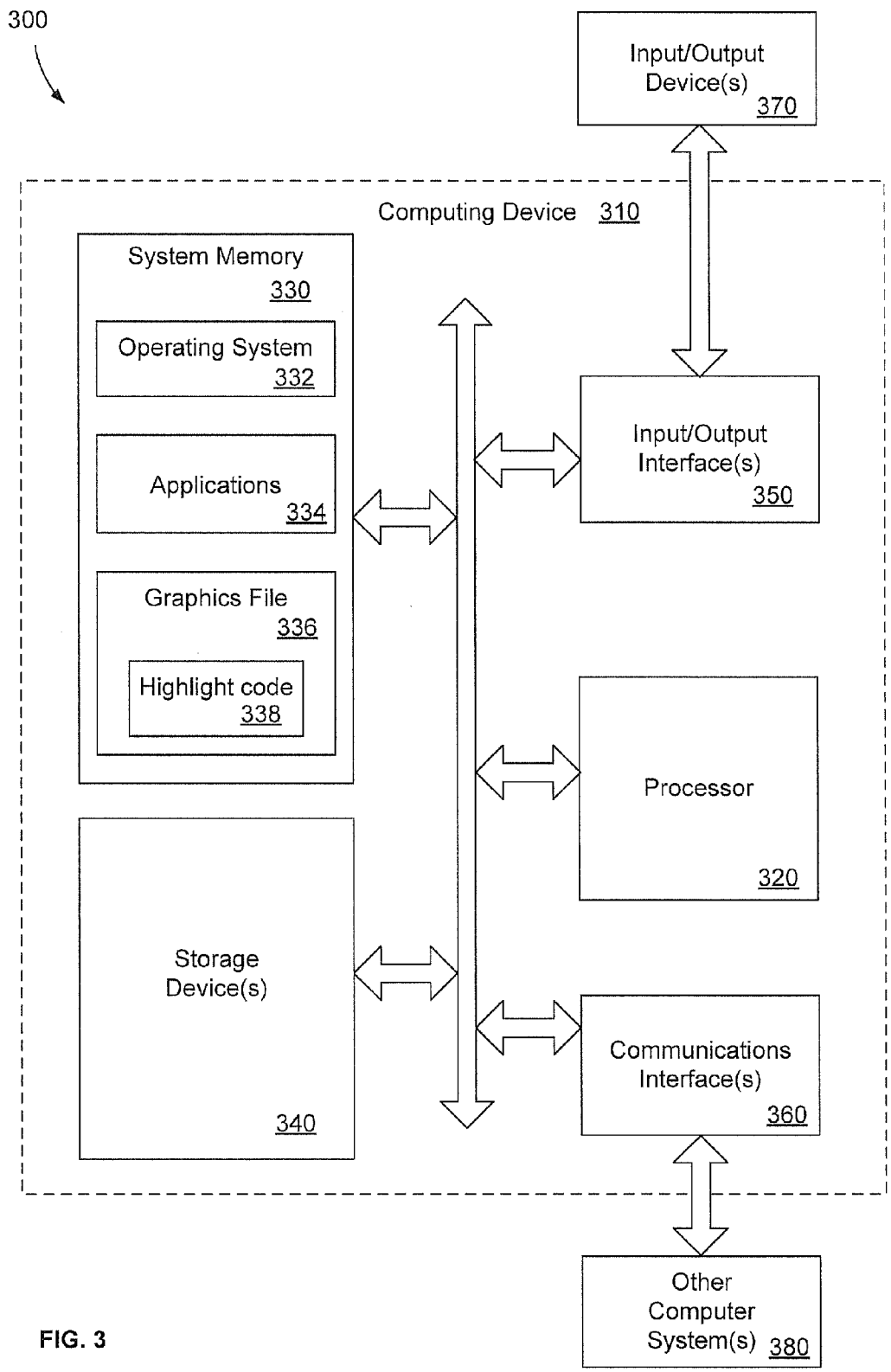
FIG. 3 is a block diagram of a computing environment operable to highlight an object in a display according to a particular embodiment.

FIG. 3 is a block diagram of a computing environment 300 including a general purpose computing device 310 operable to support embodiments of computer-implemented methods and computer-executable program instructions (or code) according to the present disclosure. For example, the computing device 310, or portions thereof, is operable to render a display of a graphics file using a painter model and to highlight an object in the rendered display by dynamically generating a highlight object. In another example, the computing device 310, or portions thereof, is operable to automatically process a file to identify objects that are to be provided with interactive features, to name (or assign identifiers to) the objects, to generate corresponding event capture objects for each object that is to be provided interactive features, to dynamically (at runtime) generate and display a highlight object corresponding to a particular event capture object when the particular event capture object detects a first interaction event, and to dynamically (at runtime) remove (and delete) the highlight object when the particular event capture object detects a second interaction event.

The computing device 310 may include at least one processor 320. Within the computing device 310, the at least one processor 320 may communicate with a system memory 330, one or more storage devices 340, one or more input/output interfaces 350, one or more communications interfaces 360, or a combination thereof.

The system memory 330 may include volatile memory devices (e.g., random access memory (RAM) devices), nonvolatile memory devices (e.g., read-only memory (ROM) devices, programmable read-only memory, and flash memory), or both. The system memory 330 may include an operating system 332, which may include a basic/input output system for booting the computing device 310 as well as a full operating system to enable the computing device 310 to interact with users, other programs, and other devices. The system memory 330 also typically includes one or more application programs 334, such as a painter model rendering application, e.g., an application that is able to render Scalable Vector Graphics (SVG)-compliant files or other painter model graphics files. The system memory 330 also may include one or more graphics files 336 which may include or be associated with highlight code 338. The highlight code 338 may include generic code (such as one or more of the dynamic hotspot handlers described with reference to FIG. 1) that is executable by the processor 320 to dynamically generate and display a highlight object and to later remove the highlight object from the rendered display.

The processor 320 may also communicate with one or more storage devices 340. For example, the one or more storage devices 340 may include nonvolatile storage devices, such as magnetic disks, optical disks, or flash memory devices. The storage devices 340 may include both removable and non-removable memory devices. The storage devices 340 may be configured to store an operating system, applications and program data. In a particular embodiment, the system memory 330, the storage devices 340, or both, include tangible, non-transitory computer-readable media.

The processor 320 may also communicate with one or more input/output interfaces 350 that enable the computing device 310 to communicate with one or more input/output devices 370 to facilitate user interaction. The input/output interfaces 350 may include serial interfaces (e.g., universal serial bus (USB) interfaces or TREE 1394 interfaces), parallel interfaces, display adapters, audio adapters, and other interfaces. The input/output devices 370 may include keyboards, pointing devices, displays, speakers, microphones, touch screens, and other devices. The processor 320 may detect interaction events based on user input received via the input/output interfaces 350. Additionally, the processor 320 may send the rendered display to a display device via the input/output interfaces 350.

The processor 320 may communicate with other computer systems 380 via the one or more communications interfaces 360. The one or more communications interfaces 360 may include wired Ethernet interfaces, IEEE 802 wireless interfaces, Bluetooth communication interfaces, or other network interfaces. The other computer systems 380 may include host computers, servers, workstations, and other computing devices.

Thus, particular embodiments of a computer system use a generic portion of code to generate a highlight object corresponding to an event capture object at runtime. The generic portion of code may generate the highlight object using parameters that define the event capture object such that the highlight object has a size, shape and coordinate position identical to the size, shape and coordinate position of the event capture object. Accordingly, a graphics file that uses embodiments disclosed herein can be significantly smaller (i.e., use less memory) than a graphics file that includes data defining the highlight object.

Embodiments described above illustrate but do not limit the disclosure. It should also be understood that numerous modifications and variations are possible in accordance with the principles of the present disclosure. Accordingly, the scope of the disclosure is defined only by the following claims.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
    detecting, at a processor, an interaction event using an event capture object of a rendered display of a graphics file, wherein the graphics file is rendered to generate the rendered display by layering one or more foreground objects over one or more background objects;
    in response to detecting the interaction event, executing, at the processor, code associated with the graphics file to:

generate a highlight object below a first background object of the one or more background objects, the highlight object corresponding to the event capture object, wherein generating the highlight object includes determining a highlight identifier of the highlight object based on an event capture identifier of the event capture object, wherein the event capture identifier includes a first object name, wherein the highlight identifier includes a second object name, and wherein the second object name comprises the first object name; and modify the rendered display to display the highlight object.

2. The method of claim 1, wherein the event capture object is a first foreground object of the one or more foreground objects, and wherein the first background object includes an object to be highlighted.

3. The method of claim 1, wherein the highlight object is generated by copying the event capture object to generate a bottom layer below the first background object, wherein the bottom layer includes the highlight object.

4. The method of claim 1, wherein the highlight object is positioned so that an object to be highlighted is positioned between the event capture object and the highlight object in the rendered display.

5. The method of claim 4, wherein the object to be highlighted includes text, a graphical element, or both, and the highlight object is displayed in a manner that visually distinguishes a region around the text, the graphical element, or both, from a remaining area of the rendering display.

6. The method of claim 1, wherein the highlight object is displayed with at least one of a color, a pattern, a texture, an opacity, an intensity, a hue, a line type, a line width, shading and another visual property that is selected based on a graphical style associated with the graphics file.

7. The method of claim 1, wherein the interaction event includes a mouse event.

8. The method of claim 1, further comprising:
detecting a second interaction event associated with the rendered display using the event capture object;
identifying the highlight identifier based on the event capture identifier in response to detecting the second interaction event; and
modifying the rendered display to remove the highlight object using the highlight identifier.

9. The method of claim 1, wherein the graphics file is a Scalable Vector Graphic (SVG) compliant file.

10. An apparatus comprising:
a non-transitory storage medium storing code associated with a graphics file, the graphics file including multiple event capture objects, and
a processor coupled to the non-transitory storage medium, wherein the processor is configured to:
detect an interaction event associated with a particular event capture object at a rendered display of the graphics file, wherein the graphics file is rendered to generate the rendered display by layering one or more foreground objects over one or more background objects;
in response to detecting the interaction event, executing the code associated with the graphics file to:
determine information descriptive of the particular event capture object;
generate a highlight object below a first background object of the one or more background objects, the highlight object corresponding to the particular event capture object, wherein generating the highlight object includes determining a highlight identifier of the highlight object based on an event capture identifier of the event capture object, wherein the event capture identifier includes a first object name, wherein the highlight identifier includes a second object name, and wherein the second object name comprises the first object name; and modify the rendered display to display the highlight object.

11. The apparatus of claim 10, wherein the highlight object is generated to have a same size, a same shape, and a same coordinate position as the particular event capture object.

12. The apparatus of claim 10, wherein the information descriptive of the particular event capture object includes a size, a shape, and a coordinate position of the particular event capture object.

13. The apparatus of claim 10, wherein the graphics file is a vector graphics file that supports user embedded runtime code and wherein a portion of the graphics file that is to be highlighted is positioned between the particular event capture object and the highlight object in the rendered display.

14. The apparatus of claim 10, wherein the highlight object is generated with an attribute that causes the highlight object to be visually distinguished from a remaining area of the rendered display.

15. The apparatus of claim 10, wherein the processor is configured to detect a second interaction event and to modify the rendered display to remove the highlight object in response to the second interaction event.

16. The apparatus of claim 15, wherein data defining the highlight object is not stored in memory after the highlight object is removed from the display.

17. A non-transitory computer-readable storage medium comprising processor-executable code that, when executed by a processor, causes the processor to perform operations including:
detecting an interaction event using an event capture object of a rendered display of a graphics file, wherein the graphics file is rendered to generate the rendered display by layering one or more foreground objects over one or more background objects;
determining information descriptive of the event capture object;
generating a highlight object below a first background object of the one or more background objects, the highlight object corresponding to the event capture object, wherein generating the highlight object includes determining a highlight identifier of the highlight object based on an event capture identifier of the event capture object, wherein the event capture identifier includes a first object name, wherein the highlight identifier includes a second object name, and wherein the second object name comprises the first object name; and
modifying the rendered display to display the highlight object.

18. The non-transitory computer-readable storage medium of claim 17, wherein the graphics file is a vector graphics file that supports user embedded runtime code, and wherein a portion of the graphics file that is to be highlighted is positioned between the event capture object and the highlight object in the rendered display after the highlight object is generated.

19. The non-transitory computer-readable storage medium of claim 17, wherein the information descriptive of the event capture object includes a first size, a first shape, and a first coordinate position of the event capture object, and wherein the highlight object is generated to have a second size, a second shape, and a second coordinate position corresponding to the size, the shape, and the coordinate position of the event capture object.

20. The non-transitory computer-readable storage medium of claim 17, wherein the operations further include:
   detecting a second interaction event associated with the rendered display using the event capture object, wherein the interaction event is a mouse pointer entering boundaries of the event capture object in the rendered display, and wherein the second interaction event is the mouse pointer leaving the boundaries of the event capture object on the rendered display;
   identifying the highlight identifier based on the event capture identifier in response to detecting the second interaction event; and
   modifying the rendered display to remove the highlight object using the highlight identifier.

* * * * *